(12) United States Patent
Lo et al.

(10) Patent No.: US 11,347,920 B2
(45) Date of Patent: May 31, 2022

(54) CIRCUIT SYNTHESIS OPTIMIZATION FOR IMPLEMENTS ON INTEGRATED CIRCUIT

(71) Applicant: Taiwan Semiconductor Manufacturing Company, Ltd., Hsincu (TW)

(72) Inventors: Chao-Chun Lo, Hsinchu (TW); Boh-Yi Huang, San Jose, CA (US); Chih-Yuan Stephen Yu, San Jose, CA (US); Yi-Lin Chuang, Taipei (TW); Chih-Sheng Hou, Taoyuan (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 17/075,760

(22) Filed: Oct. 21, 2020

(65) Prior Publication Data
US 2022/0121798 A1 Apr. 21, 2022

(51) Int. Cl.
| | |
|---|---|
| *G06F 30/30* | (2020.01) |
| *G06F 30/337* | (2020.01) |
| *G06F 30/327* | (2020.01) |
| *G06F 30/392* | (2020.01) |
| *G06F 30/31* | (2020.01) |
| *G06F 30/3308* | (2020.01) |
| *G06F 119/08* | (2020.01) |
| *G06F 119/12* | (2020.01) |
| *G06F 119/18* | (2020.01) |
| *G06F 119/06* | (2020.01) |

(52) U.S. Cl.
CPC ............ *G06F 30/337* (2020.01); *G06F 30/31* (2020.01); *G06F 30/327* (2020.01); *G06F 30/3308* (2020.01); *G06F 30/392* (2020.01); *G06F 2119/06* (2020.01); *G06F 2119/08* (2020.01); *G06F 2119/12* (2020.01); *G06F 2119/18* (2020.01)

(58) Field of Classification Search
None
See application file for complete search history.

(56) References Cited

U.S. PATENT DOCUMENTS

| | | | | |
|---|---|---|---|---|
| 8,924,898 B2 * | 12/2014 | Killian | ...................... | G06F 8/41 716/100 |
| 9,213,789 B2 * | 12/2015 | Lien | ........................ | G06F 30/30 |
| 11,048,837 B2 * | 6/2021 | Chen | ..................... | G06F 30/331 |

\* cited by examiner

*Primary Examiner* — Leigh M Garbowski
(74) *Attorney, Agent, or Firm* — Jones Day (57) ABSTRACT

Systems, methods, and computer programs products are described for optimizing circuit synthesis for implementation on an integrated circuit. A register transfer level code description of logic behavior of a circuit. The register transfer level code description is converted into structurally defined circuit designs for multiple types of components and feature size technologies. A floor plan of each structurally defined circuit design is generated. A physically simulated circuit is created for each floor plan. A range of operating conditions is swept over to analyze power, performance, and area of each physically simulated circuit.

20 Claims, 8 Drawing Sheets

CIRCUIT SYNTHESIS OPTIMIZATION FOR IMPLEMENTS ON INTEGRATED CIRCUIT

FIELD

The technology described in this disclosure relates generally to integrated circuit systems chip design implementation flow and more particularly to optimizing circuit synthesis for implementation on an integrated circuit.

BACKGROUND

Designing application specific integrated circuits (ASIC) and System on Chips (SoC) with semiconductor devices can be optimized using a number of techniques. Such designs can be a range of varying silicon design, implementation, and manufacturing technologies, but not limited to 3 nm, 5 nm 7 nm, 10 nm, 12 nm, 16 nm, 28 nm, and/or many other technologies. Storage elements of these chips such as random access memory (RAM) and the like can optimized based using a number of techniques such as power-performance-area. Such optimization can be labor intensive and time consuming.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

As electronic components continue to decrease in size and circuit layouts become more sophisticated, simulations of circuit layouts can help optimize circuit design and placement. Thousands of ASIC designs exist for various RAMs, registers, and other storage elements. These designs can vastly differ from each other as each design can take into consideration various types of RAM compilers, cell-types (e.g., 6T or 8T), device speed or density, component threshold voltages, power requirements, and the like. Compiling together these designs can help to optimize new circuit designs. The new designs can incorporate appropriate features from existing designs in a way that optimizes the layout for a particular purpose. In other words, the designs can be synthesizable for silicon implementation across various device sizes (5 nm, 7 nm, 10 nm, 12 nm, 16 nm, 28 nm, etc.). The compiled designs (e.g., extracted data) include descriptions of a circuit's behavior. Using the extracted data, new circuits can be physically simulated by translating the circuit's behavior into a set of structurally defined circuit layouts defining various electrical component sizes and layouts. The layouts can be analyzed to access the physically simulated circuits and then a range of operating conditions for the physically simulated circuits can be swept over (e.g., using a synthesis variable sweep system (SVSS)) to generate an optimized netlist having a set of analyses of a power, performance, and area (PPA) characteristics for physically simulated circuits. This output can provide an optimized physically simulated circuit. Such circuits can be applied in many different industries such as high performance computing (HPC), 5G mobile, automobile, artificial intelligence, or internet of things (IoT).

Figure 1:
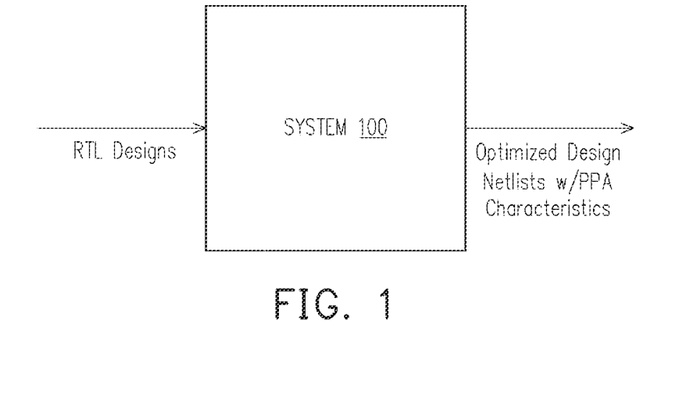
FIG. 1 is a block diagram of an exemplary system for analyzing and extracting data from RAM configurations and register files across various technology sizes (e.g., 5 nm, 7 nm, 10 nm, 12 nm, 16 nm, 28 nm, etc.) in accordance with various embodiments of the present disclosure.

FIG. 1 is a block diagram of an exemplary system 100 for analyzing and extracting data from RAM configurations and register files across various technology sizes (e.g., 5 nm, 7 nm, 10 nm, 12 nm, 16 nm, 28 nm, etc.) in accordance with various embodiments of the present disclosure. System 100 can be a data processing computer system which receives register transfer level (RTL) designs of RAM behavior models that define logic behavior of various circuits. An RTL is a design abstraction which models a synchronous digital circuit in terms of the flow of digital signals between hardware registers, and the logical operations performed on those signals. System 100 uses a plurality of modules, as described in more detail in FIGS. 2-3, to generate an optimized design netlist for a new circuit design. The optimized design netlist has a set of analyses of a power, performance, and area characteristics for physically simulated circuits. A netlist is a description of the connectivity of an electronic circuit. The netlist is a list that defines various electrical components and node connections between those components. The new circuit design can be an optimized design based on the RTL designs input into system 100. The netlist output by system 100 also includes optimized power, performance, and area (PPA) features. PPA analysis is used to optimize designs as each of the power, performance, and area of a circuit design are integral aspects of the design. PPA analysis is used during circuit design.

Figure 2:
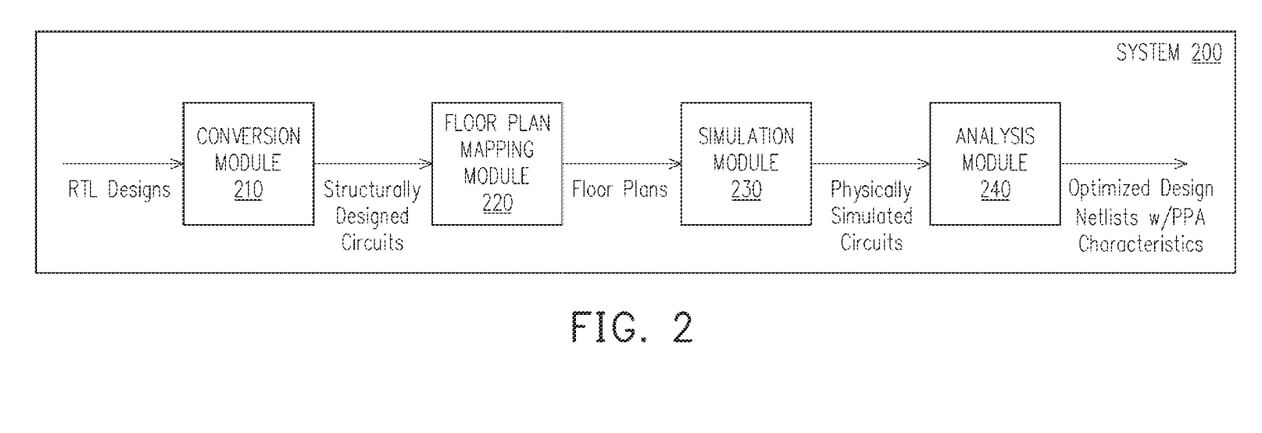
FIG. 2 is a block diagram of another exemplary system for analyzing and extracting data from RAM configurations and register files across various technology sizes (e.g., 5 nm, 7 nm, 10 nm, 12 nm, 16 nm, 28 nm, etc.) in accordance with various embodiments of the present disclosure.

FIG. 2 is a block diagram of another exemplary system 200 for analyzing and extracting data from RAM configurations and register files across various technology sizes (e.g., 5 nm, 7 nm, 10 nm, 12 nm, 16 nm, 28 nm, etc.) in accordance with various embodiments of the present disclosure. System 200 includes a conversion module 210, a floor plan mapping module 220, a simulation module 230, and an analysis module 240. The conversion module 210 receives register transfer level code (RTL), as described in FIG. 1. Register transfer level code is software code use within hardware description languages. A physical circuit can be described using register transfer level code that describe digital signal flow between hard registers and logical operations (e.g., AND, NAND, OR, NOR) performed on the digital signals by components of the physical circuit. The conversion module 210 accesses a register transfer level code description of that circuit logic behavior. The conversion model 210 then converts the register transfer level code into a set of structurally defined circuit designs (e.g., AND gate(s), NAND circuits, OR gate(s), NOR circuits) for multiple types of components (e.g., CPU, GPU, ML-NPU) and feature size technologies (e.g., 5 nm, 7 nm, 10 nm, 12 nm, 16 nm, 28 nm, etc.). The floor plan mapping module 220 accesses the set of structurally defined circuit designs and converts the set of structurally defined circuit designs into a set of floor plans. The floor plans define electrical components within the circuit design and their physical placement in a specific area (e.g., floor). The simulation module 230 accesses the set of floor plans and creates a circuit that can be simulated for each floor plan. The analysis module 240 accesses the physically simulated circuits and sweeps over a range of operating conditions for the physically simulated circuits to generate an optimized design netlist having a set of analyses of a power, performance, and area characteristics for physically simulated circuits. The analysis module 240 also sweeps over a range of operating conditions (e.g., various input voltages, various environmental environments such as high/low temperatures, high/low humidity, and the like) in parallel (e.g., at the same time) for multiple physically simulated circuits simultaneously.

Figure 3:
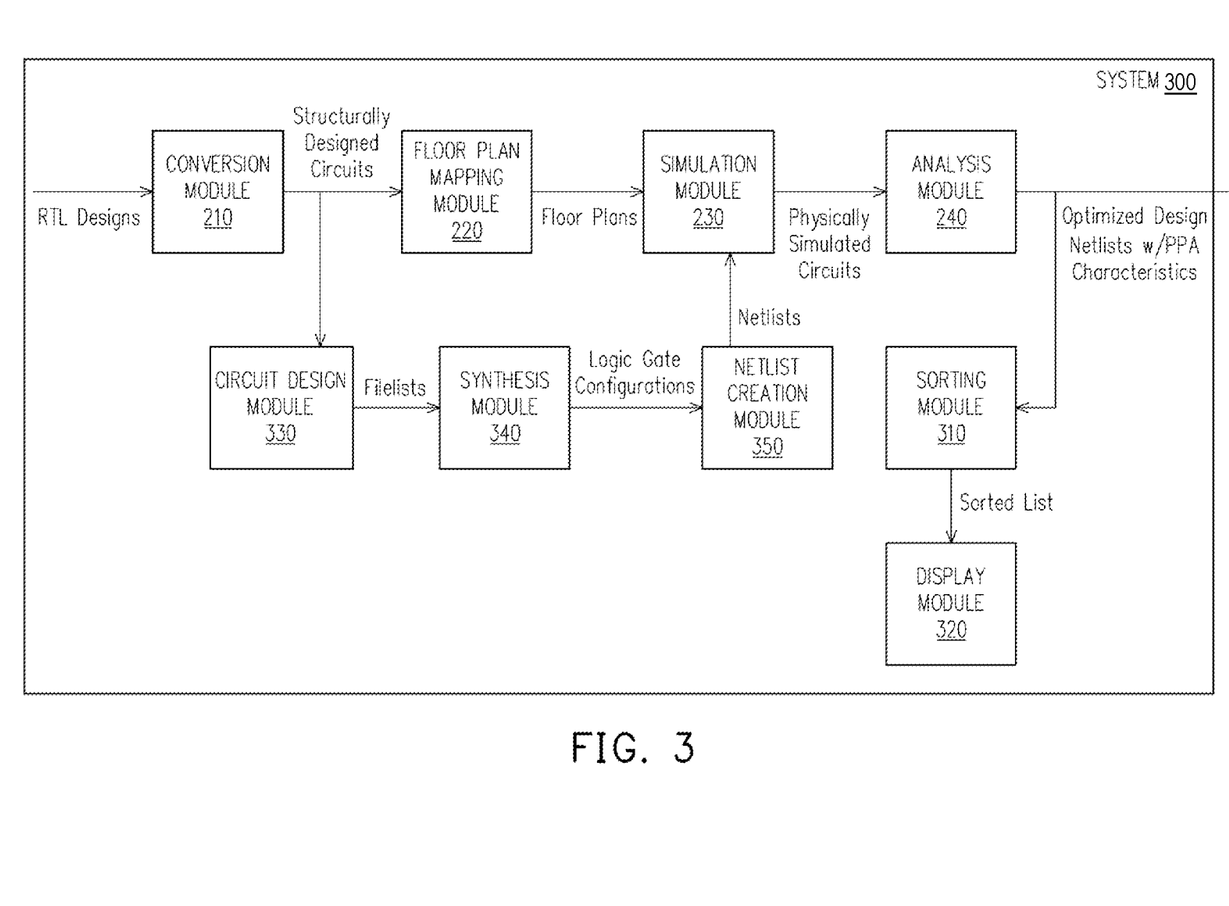
FIG. 3 is a block diagram of another exemplary system for analyzing and extracting data from RAM configurations and register files across various technology sizes (e.g., 5 nm, 7 nm, 10 nm, 12 nm, 16 nm, 28 nm, etc.) in accordance with various embodiments of the present disclosure.

FIG. 3 is a block diagram of another exemplary system 300 for analyzing and extracting data from RAM configurations and register files across various technology sizes (e.g., 5 nm, 7 nm, 10 nm, 12 nm, 16 nm, 28 nm, etc.) in accordance with various embodiments of the present disclosure. Similar to system 200 of FIG. 2, system 300 can include a conversion module 210, a floor plan mapping module 220, a simulation module 230, and an analysis module 240. Additionally, system can include one or more of a sorting module 310, a display module 320, a circuit design module 330, a synthesis module 340, and a netlist creation module 350.

The sorting module 310 accesses the analyses and generates a sorted list of the set of physically simulated circuits by power, performance, and area characteristics that define the power consumption of the circuits, performance namely a frequency that the circuit operates at, and area that the circuit occupies. These characteristics can be sorted based on power, performance, and area values. The display module 320 accesses the sorted list of physically simulated circuits and displays the sorted list of physically simulated circuits on a graphical user interface. The circuit design module 330 accesses the set of structurally defined circuit designs and converts the structurally defined circuit designs into a set of filelists for synthesis of multiple profiled configurations for power, performance, and area characteristics. The filelists define components of the circuits and interconnection points between the components. The synthesis module 340 accesses the set of filelists and synthesizes the set of filelists using a design compiler into a set of logic gate configurations. Synthesis of a circuit includes translating the register transfer level code into a generic Boolean model. That Boolean model can be optimized at the logic level to combine multiple operations into more simplistic operations. For example, components can be rearranged, combined, and/or re-combined into different components in an effort to reduce operation time and the number of overall components within the circuit. Additionally, optimization can include sequential mapping of components where logic surrounding a sequential cell can be absorbed within the cell in an effort to save area. The design compiler can also perform various optimization operations such as removing logic having no output port connections, removing redundant components (e.g., such as two sequential inverters), and/or propagating constants to reduce the overall logic components within a circuit. The netlist creation module 350 accesses the set of logic gate configurations and converts the set of logic gate configurations into a set of netlists to be used by simulation module 230. Logic gate configurations contain logic schematics that define component interconnection. These logic gate configurations can be translated into a textual representation of nodes within the configuration, components within the configurations and their interconnections. This textual representation is a netlist.

Figure 4:
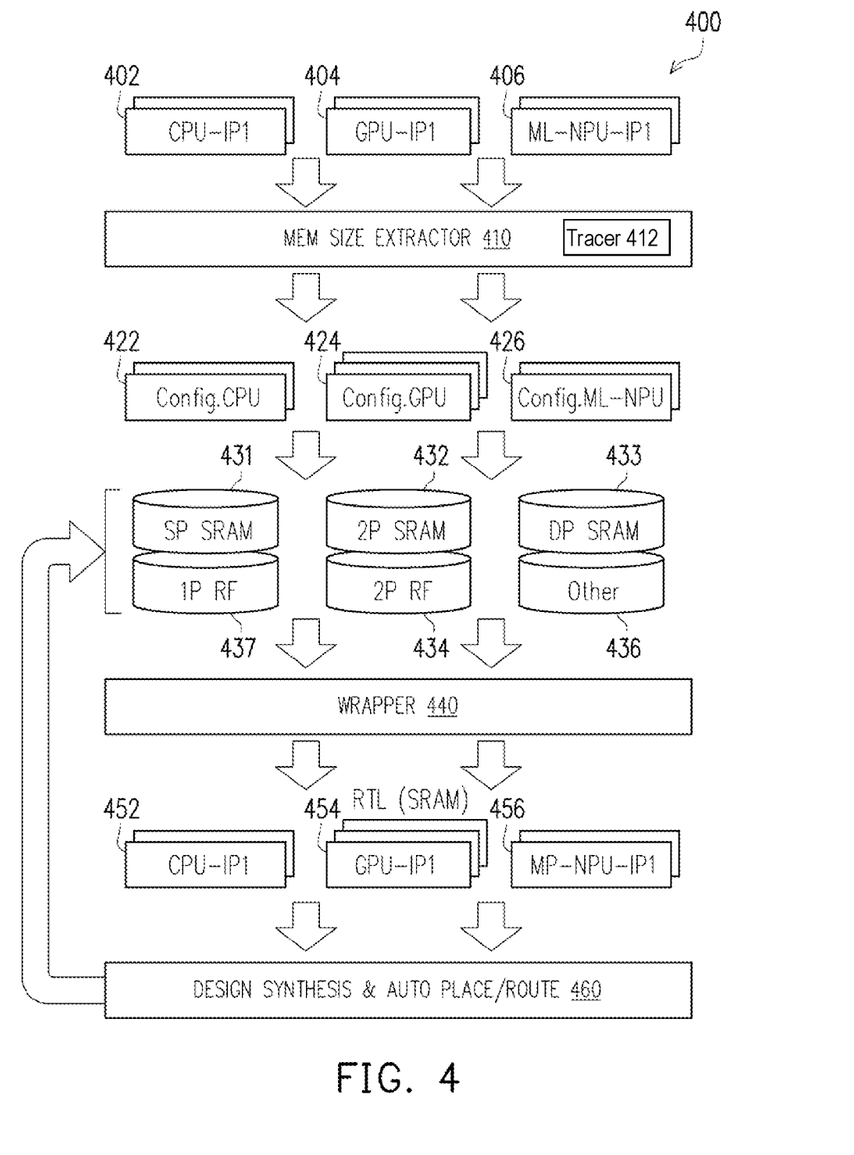
FIG. 4 is an exemplary block diagram illustrating the generation of synthesized netlists in accordance with various embodiments of the present disclosure.

FIG. 4 is an exemplary block diagram 400 illustrating the generation of synthesized netlists in accordance with various embodiments of the present disclosure. Filelists (e.g., RTL designs describing circuit logic behavior—software code which defines logical behavior of a circuit) can relate to any number of technologies such as central processing units (CPU) (e.g., CPU-IP1 402), graphical processing units (GPU) (e.g., GPU-IP1), machine learning network processor (ML-NPU) (e.g., ML-NPU-IP1) and the like. Each set of files lists can include one or more filelists associated with a different module design, as described in more detail in FIGS. 6-7. A memory size extractor 410 (e.g., synthesis module 340) processes a given set of netlists to generate logic gate configurations corresponding to each set which define the size of a given memory cell being evaluated. For example, a logic gate configuration 422 (e.g., config.CPU) corresponds to the CPU-IP1 filelist 402. The memory size extractor 410 also includes a tracer 412. Tracer 412 generates behavior information associated with at least a portion of an RTL design corresponding to a semiconductor device. For example, such behavior information can include device sizing (e.g., number of word lines and number of bit lines). Similarly, a logic gate configuration 424 (e.g., config.GPU) corresponds to the GPU-IP1 filelist 404. The logic gate configuration 426 (e.g., config.ML-NPU) corresponds to the ML-NPU-IP1 filelist 406. The logic gate configurations are compiled as previously described in detail using, for example, a register compiler such as a single-port (SP) static random access memory (SRAM) 431, a two-port SRAM 432, a dual-port (DP) SRAM 433, a 1P RF 437, a 2P RF 434, and any other type of register compiler 436. These compiled configurations are then translated by a wrapper 440 into netlists corresponding to the imported filelist (e.g., filelist 402, filelist 404, filelist 406). A wrapper is software that is defined to encapsulate the code being wrapped such that the code complexity of the code being wrapped is not visible to another interfacing software component. Instead, the wrapper itself contains more simplistic code that creates an interface with that other software component so as to ease the interaction between two software components. Wrappers can be used, for example, when two software components have different types of software code that are not compatible with one another. For example, the netlist CPU-IP1 452 corresponds with filelist CPU-IP1 402. The netlist GPU-IP1 454 corresponds with filelist GPU-IP1 404. The netlist MP-NPU-IP1 456 corresponds with ML-NPU-IP1 406. These netlists are utilized to generate an optimized circuit design using automatic placement of components and/or routing of signals (e.g., step 460). The optimized netlists are transmitted back to the compilers and stored so that they can be utilized in future circuit layouts.

Figure 5:
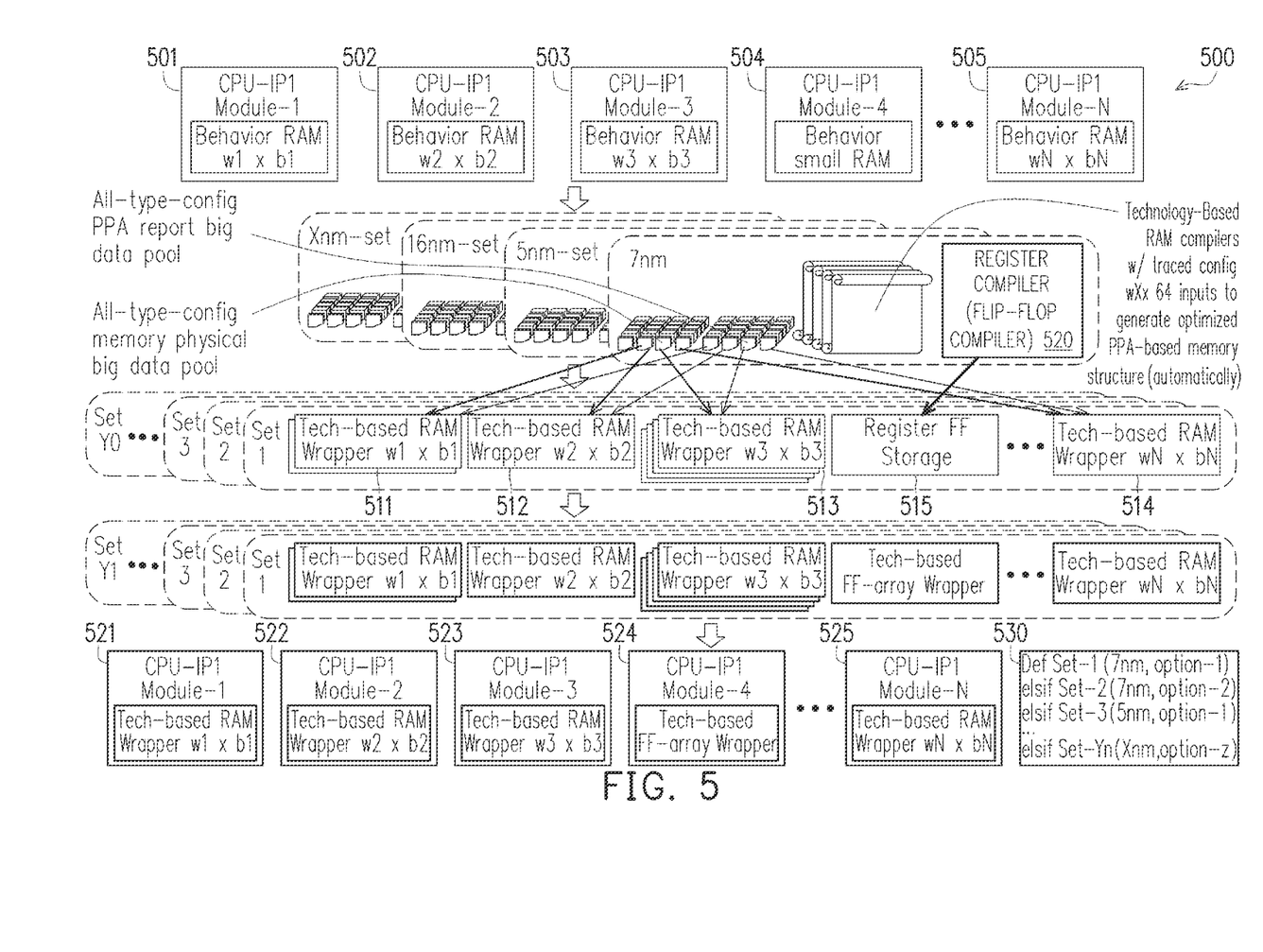
FIG. 5 is an exemplary block diagram illustrating the generation of synthesized CPU netlists in accordance with various embodiments of the present disclosure.

FIG. 5 is an exemplary block diagram 500 illustrating the generation of synthesized CPU netlists in accordance with various embodiments of the present disclosure. In this example, a set of filelists correspond to N number of modules (e.g., filelist 501, filelist 502, filelist 503, filelist 504, filelist 505, etc.). Each filelist includes specific behavior logic associated with that particular module. The set of filelists are compiled together, using register compiler or flip-flop compiler 520, into groupings based on technology sizes (e.g., 5 nm, 7 nm, 16 nm, etc.). Compiling is used to generate layouts for SRAM blocks in a layout. Each compilation includes all physical memory configurations as well as PPA configurations associated with the imported filelists 501, 502, 503, 504, 505. In other words, all of the modules having one wordline and one bitline (such as module-1 of filelist 501) across the various technology sizes (e.g., 5 nm, 7 nm, 16 nm, etc.) are compiled together. Similarly, all of the modules having two wordlines and two bitlines (such as module-2 of filelist 502) across the various technology sizes (e.g., 5 nm, 7 nm, 16 nm, etc.) are compiled together. This continues for all modules across all of the various technology sizes (e.g., 5 nm, 7 nm, 16 nm, etc.). A PPA-profiler evaluates the stored compilations (e.g., compilations 511, 512, 513, 514) to logic gate configurations for each technology size (e.g., 5 nm, 7 nm, 16 nm, etc.). The PPA analysis is described in more detail in FIG. 6. The register compiler 520 settings can be stored in register flip-flop storage 515. The compilations 511, 512, 513, 514 along with the register flip-flop storage 515 can be wrapped and compiled to generate corresponding netlists with wrapped PPA profiles (e.g., CPU netlists 521, 522, 523, 524, 525) which define power, performance, and area characteristics for various modules. A wrapper is software that is defined to encapsulate the code being wrapped such that the code complexity of the code being wrapped is not visible to another interfacing software component. Instead, the wrapper itself contains more simplistic code that creates an interface with that other software component so as to ease the interaction between two software components. Wrappers can be used, for example, when two software components have different types of software code that are not compatible with one another. In the instance of the embodiment illustrated in FIG. 5, the PPA profiles define specific power, performance, and area requirements affiliated with different module sizes (e.g., one wordline/bitline, two wordlines/bitlines, etc.). In some embodiments, a project user defined configurator can set specific sizing definitions for the circuit to be optimized (e.g., user definitions 530). In other words, a user can set specific dimensions for a circuit through user input.

Figure 6:
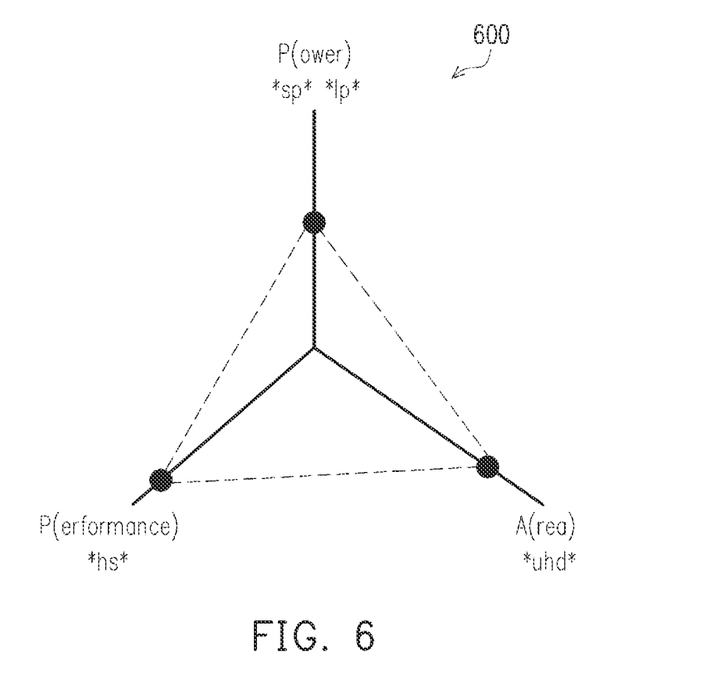
FIG. 6 is an exemplary graphic illustrating a PPA analysis in accordance with various embodiments of the present disclosure.

FIG. 6 is an exemplary graphic 600 illustrating a PPA analysis. Using a PPA profiler, various filelists are evaluated to simultaneously increase performance, maintain low power consumption, and minimize device area. These calculations are performed by triangulating constants associated with power (e.g., sp, Ip), area (e.g., udh), and performance (e.g., hs). These constants define power consumed by an electronic device, an area that the electronic device components occupy, and the clock frequencies (e.g., performance) needed to operate the electronic device. Triangulation is the process of measuring distances between each of the constants (e.g., points illustrated on the graphic 600). The ultimate goal being to have the power constants, sp, Ip, and the area constant udh be at their lowest possible values while not sacrificing circuit performance hs. All three of these metrics (e.g., power, area, performance) are interdependent such that modifying one of these values impacts the other two.

Figure 7:
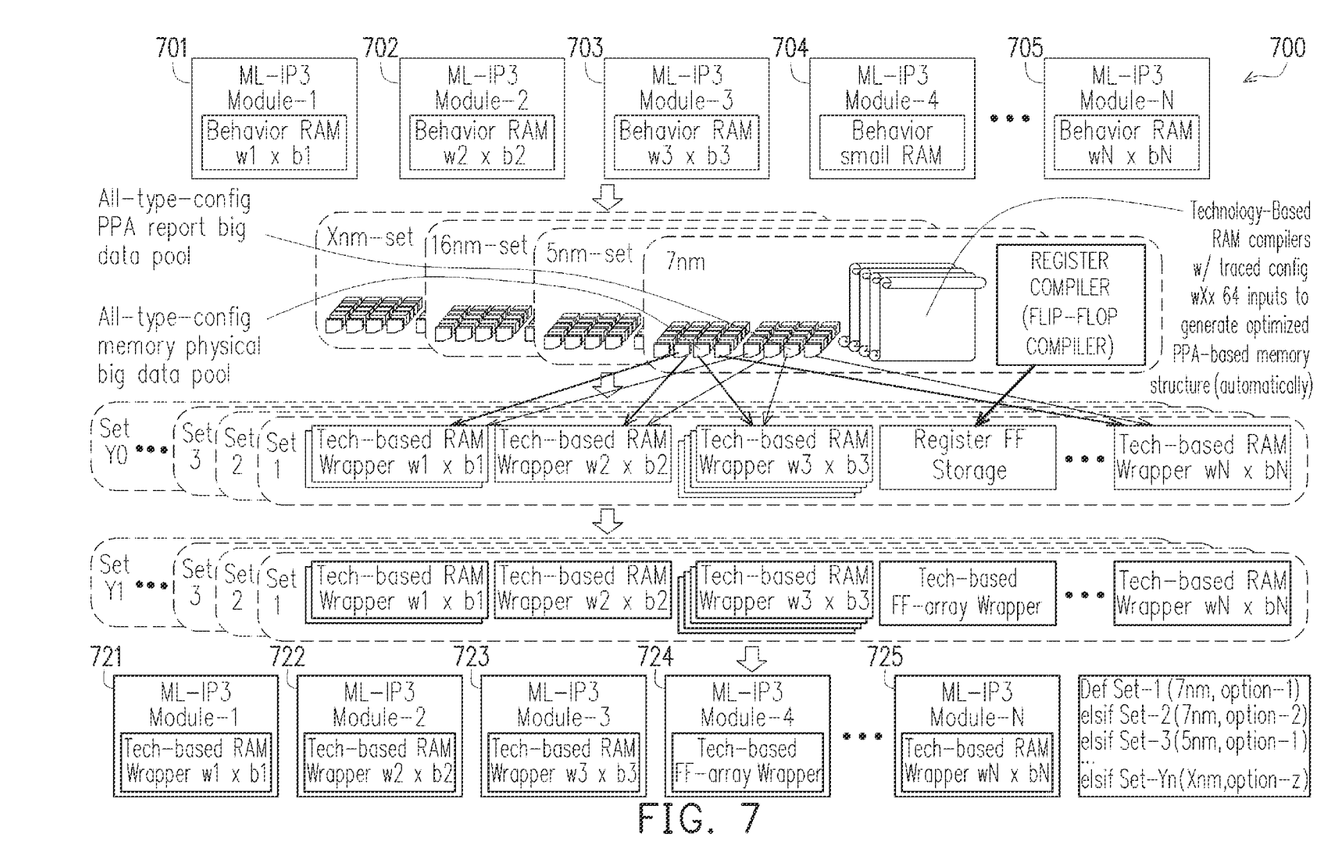
FIG. 7 is an exemplary is an exemplary block diagram illustrating the generation of synthesized ML netlists in accordance with various embodiments of the present disclosure.

FIG. 7 is an exemplary block diagram 700 illustrating the generation of synthesized ML netlists in accordance with various embodiments of the present disclosure. In this example, a set of filelists correspond to N number of modules (e.g., filelist 701, filelist 702, filelist 703, filelist 704, filelist 705, etc.). Each filelist includes specific behavior logic associated with that particular module. Filelist 701 describes a first module (e.g., module-1) having one wordline and one bitline. Filelist 702 describes a second module (e.g., module-2) having two wordlines and two bitlines. Filelist 703 describes a third module (e.g., module-3) having three wordlines and three bitlines. Filelist 704 describes a small RAM having at least four wordlines and at least four bit lines. Filelist 705 describes a Nth-module having any number (e.g., N) wordlines and any number (e.g., N) bitlines. As described in detail in FIG. 7, filelists 701, 702, 703, 704, 705 are processed and corresponding netlists with wrapped PPA profiles (e.g., ML netlists 721, 722, 723, 724, 725) are generated.

Figure 8:
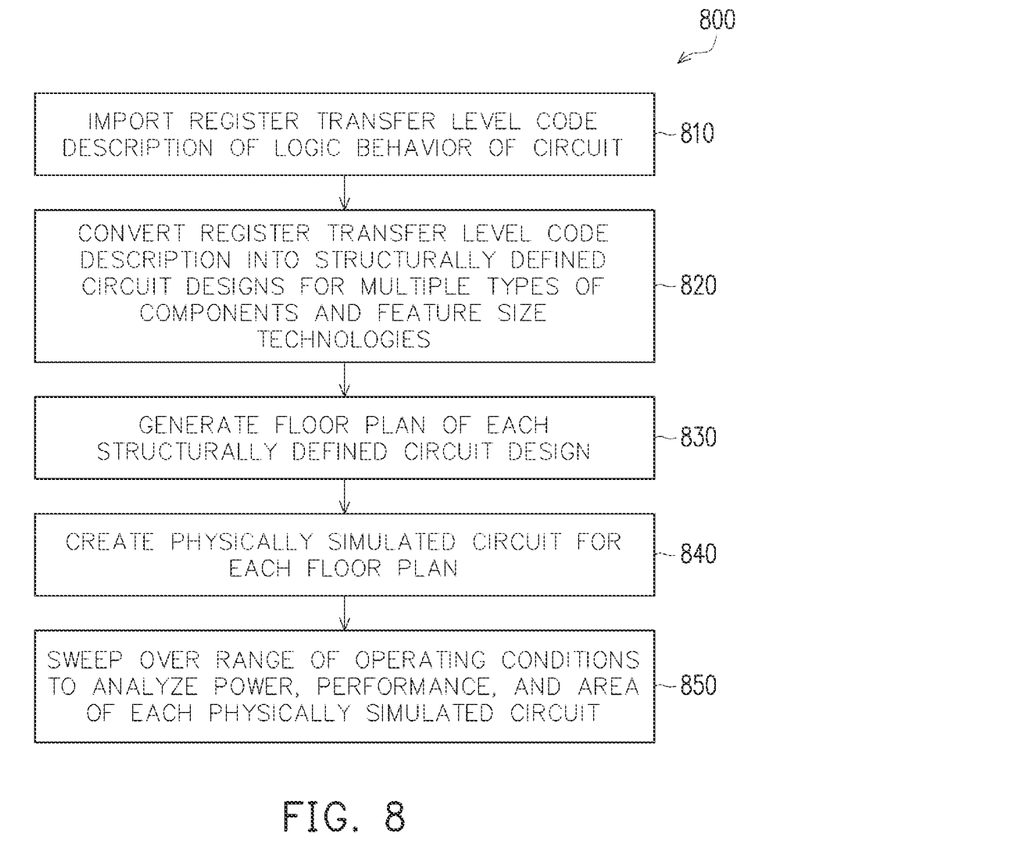
FIG. 8 is an exemplary flow chart illustrating a method for optimizing circuit synthesis for implementation on an integrated circuit in accordance with various embodiments of the present disclosure.

FIG. 8 is an exemplary flow chart 800 illustrating a method for optimizing circuit synthesis for implementation on an integrated circuit in accordance with various embodiments of the present disclosure. While FIG. 8 is described herein with reference to previously described structures for ease in understanding, it is understand that the method applies to many other structures as well. A register transfer level code description of logic behavior of a circuit is imported (e.g., step 810) by conversion module 210. The register transfer level code description is converted into structurally defined circuit designs for multiple types of components and feature size technologies (e.g., step 820) using conversion module 210. A floor plan of each structurally defined circuit design is generated (e.g., step 830) based on the structurally designed circuits using floor plan mapping module 220. A physically simulated circuit is created for each floor plan (e.g., step 840) to generate physically simulated circuits using simulation module 230. A range of operating conditions are swept over to analyze power, performance, and area of each physically simulated circuit (e.g., step 850) using analysis module 240.

Figure 9:
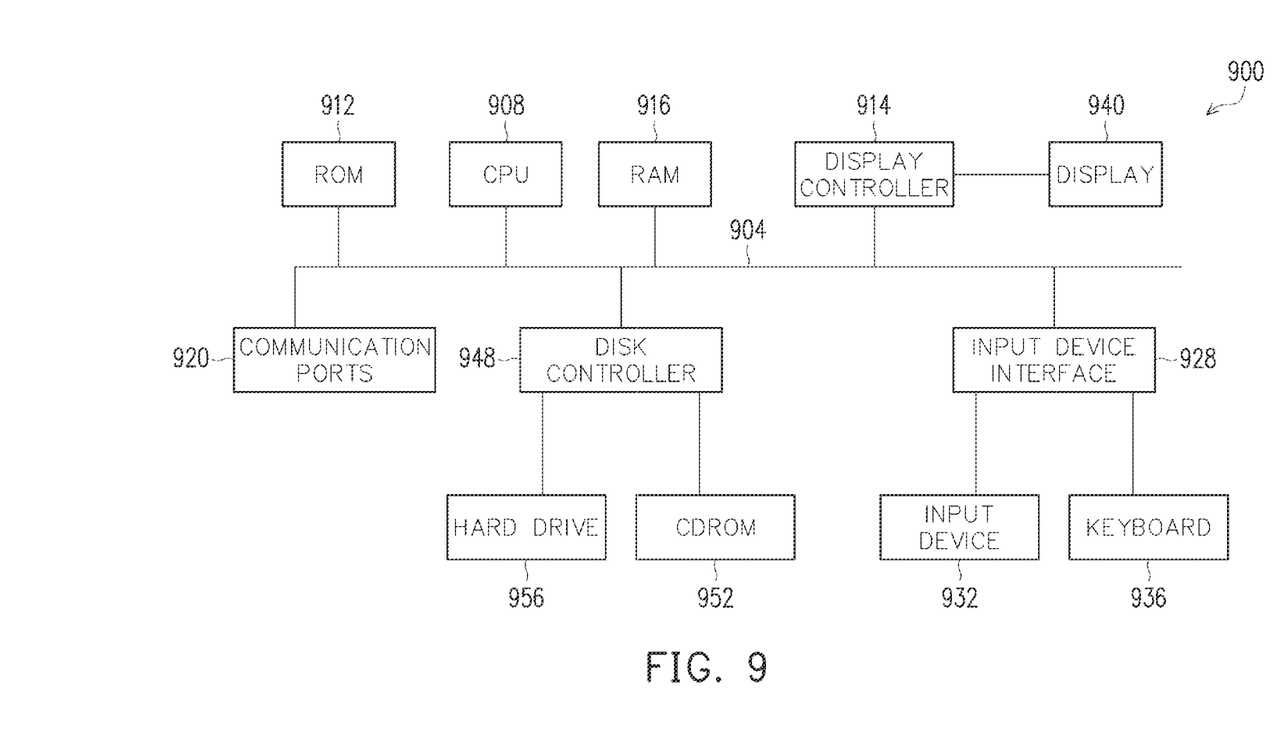
FIG. 9 is an exemplary block diagram illustrating a sample computing device architecture for implementing various aspects described herein.

FIG. 9 is an exemplary block diagram 900 illustrating a sample computing device architecture for implementing various aspects described herein. A bus 904 can serve as the information highway interconnecting the other illustrated components of the hardware. A processing system 908 labeled CPU (central processing unit) (e.g., one or more computer processors/data processors at a given computer or at multiple computers), can perform calculations and logic operations required to execute a program. A non-transitory processor-readable storage medium, such as read only memory (ROM) 912 and random access memory (RAM) 916, can be in communication with the processing system 908 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 948 can interface one or more optional disk drives to the system bus 904. These disk drives can be external or internal CD-ROM, CD-R, CD-RW or DVD, or solid state drives such as 952, or external or internal hard drives 956. As indicated previously, these various disk drives 952, 956 and disk controllers are optional devices. The system bus 904 can also include at least one communication port 920 to allow for communication with external devices either physically connected to the computing system or available externally through a wired or wireless network. In some cases, the communication port 920 includes or otherwise comprises a network interface.

To provide for interaction with a user, the subject matter described herein can be implemented on a computing device having a display device 940 (e.g., a CRT (cathode ray tube) or LCD (liquid crystal display) monitor) for displaying information obtained from the bus 904 to the user and an input device 932 such as keyboard 936 and/or a pointing device (e.g., a mouse or a trackball) and/or a touchscreen by which the user can provide input to the computer. Other kinds of input devices 932 can be used to provide for interaction with a user as well; for example, feedback provided to the user can be any form of sensory feedback (e.g., visual feedback, auditory feedback by way of a microphone or tactile feedback); and input from the user can be received in any form, including acoustic, speech, or tactile input. The input device 932 and the keyboard 936 can be coupled to and convey information via the bus 904 by way of an input device interface 928. Other computing devices, such as dedicated servers, can omit one or more of the display 940 and display interface 914, the input device 932, the keyboard 936, and input device interface 928.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, Perl, Python, Tcls, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Use of the various processes as described herein can provide a number of advantages. For example, use of the subject matter can shorten ASIC development schedules as circuit are automatically optimized through design and require minimal to no re-design efforts. The simulations described herein also facilitate device validation without the time delay associated with producing and manually testing a device.

In one embodiment, a computer-implemented method of optimizing circuit synthesis for implementation on an integrated circuit includes importing a register transfer level code description of logic behavior of a circuit. The register transfer level code description is converted into structurally defined circuit designs for multiple types of components and feature size technologies. A floor plan of each structurally defined circuit design is generated. A physically simulated circuit is created for each floor plan. A range of operating conditions are swept over to analyze power, performance, and area of each physically simulated circuit.

In another embodiment, a computer-implemented system for optimizing circuit synthesis for implementation on an integrated circuit, includes a conversion module, a floor plan mapping module, a simulation module, and an analysis module. The conversion module is configured to access a register transfer level code description of behavior of a circuit and convert the register transfer level code into a set of structurally defined circuit designs for multiple types of components and feature size technologies. The simulation module is configured to access the set of structurally defined circuit designs and create a physically simulated circuit for each floor plan. The analysis module is configured to access the physically simulated circuits and sweep over a range of operating conditions for the physically simulated circuits to generate a set of analyses of a power, performance, and area characteristics for physically simulated circuits.

In yet another embodiment, a non-transitory computer-readable medium is encoded with memory storing instructions for fabricating an integrated circuit, which when executed result in various operations such as generating a floor plan of each structurally defined circuit design. A physically simulated circuit is created for each floor plan. A range of operating conditions is swept over to analyze power, performance, and area of each physically simulated circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-implemented method of optimizing circuit synthesis for implementation on an integrated circuit comprising:
    importing a register transfer level code description of logic behavior of a circuit;
    converting the register transfer level code description into structurally defined circuit designs for multiple types of components and feature size technologies;
    generating a floor plan of each structurally defined circuit design;
    creating a physically simulated circuit for each floor plan;
    sweeping over a range of operating conditions to analyze power, performance, and area of each physically simulated circuit.

2. The computer-implemented method of claim 1, further comprising sorting the physically simulated circuits by power, performance, and area characteristics.

3. The computer-implemented method of claim 2, further comprising displaying the physically simulated circuits sorted in order by power, performance and area characteristics on a graphical user interface.

4. The computer-implemented method of claim 1, further comprising generating filelists for synthesis of power, performance, and area characteristics before generating a floor plan of each structurally defined circuit design.

5. The computer-implemented method claim of claim 4, further comprising synthesizing the filelists into logic gate configurations using a design compiler.

6. The computer-implemented method of claim 5, further comprising generating netlists of each logic gate configuration.

7. The computer-implemented method of claim 1, wherein the sweeping over a range of operating conditions occurs in parallel for multiple physically simulated circuits simultaneously.

8. A computer-implemented system for optimizing circuit synthesis for implementation on an integrated circuit, the computer-implemented system comprising:
    a conversion module configured to access a register transfer level code description of behavior of a circuit and convert the register transfer level code into a set of structurally defined circuit designs for multiple types of components and feature size technologies;
    a simulation module configured to access the set of structurally defined circuit designs and create a physically simulated circuit for each floor plan; and
    an analysis module configured to access the physically simulated circuits and sweep over a range of operating conditions for the physically simulated circuits to generate a set of analyses of a power, performance, and area characteristics for physically simulated circuits.

9. The computer-implemented system of claim 8, further comprising a sorting module configured to access the analyses and generate a sorted list of the set of physically simulated circuits by power, performance, and area characteristics.

10. The computer-implemented system of claim 9, further comprising a display module configured to access the sorted list of physically simulated circuits and display the sorted list of physically simulated circuits on a graphical user interface.

11. The computer-implemented system of claim 8, further comprising a circuit design module configured to access the set of structurally defined circuit designs and convert the structurally defined circuit designs into a set of filelists for synthesis of power, performance, and area characteristics.

12. The computer-implemented system of claim 11, further comprising a synthesis module configured to access the set of filelists and synthesize the set of filelists using a design compiler into a set of logic gate configurations.

13. The computer-implemented system of claim 12, further comprising a netlist creation module configured to access the set of logic gate configurations and convert the set of logic gate configurations into a set of netlists.

14. The computer-implemented system of claim 8, wherein the analysis module sweeps over a range of operating conditions in parallel for multiple physically simulated circuits simultaneously.

15. A non-transitory computer-readable medium encoded with memory storing instructions for fabricating an integrated circuit, which when executed result in operations comprising:
    generating a floor plan of each structurally defined circuit design of a plurality of structurally defined circuit designs;
    creating a physically simulated circuit for each floor plan; and
    sweeping over a range of operating conditions to analyze power, performance, and area of each physically simulated circuit.

16. The non-transitory computer-readable medium of claim 15, further comprising sorting the physically simulated circuits by power, performance, and area characteristics.

17. The non-transitory computer-readable medium of claim 15, further comprising generating netlists for synthesis of power, performance, and area characteristics before generating a floor plan of each structurally defined circuit design.

18. The non-transitory computer-readable medium of claim 17, further comprising synthesizing filelists into logic gate configurations using a design compiler.

19. The non-transitory computer-readable medium of claim 18, further comprising generating netlists of each logic gate configuration.

20. The non-transitory computer-readable medium of claim 15, wherein the sweeping over a range of operating conditions occurs in parallel for multiple physically simulated circuits simultaneously.

* * * * *